Aug. 11, 1925.
W. P. REAVES
1,549,028
MIRROR BOX FOR STEREOSCOPES
Filed March 3, 1923
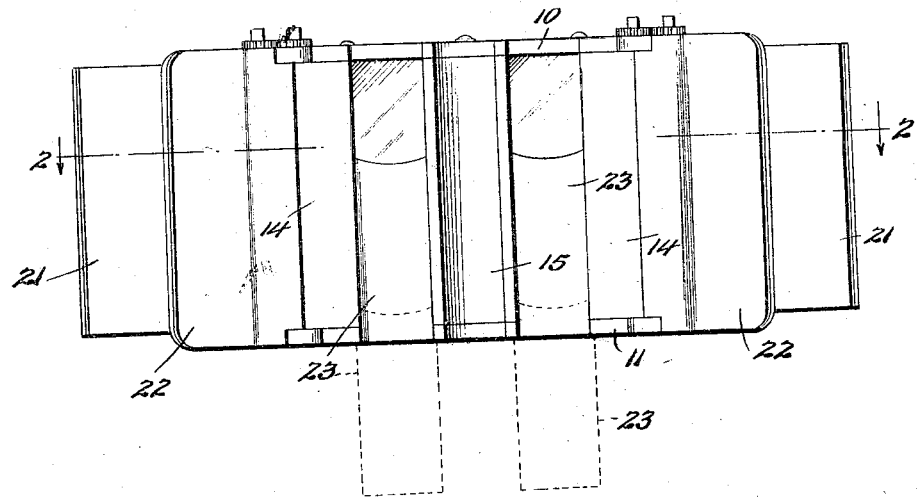
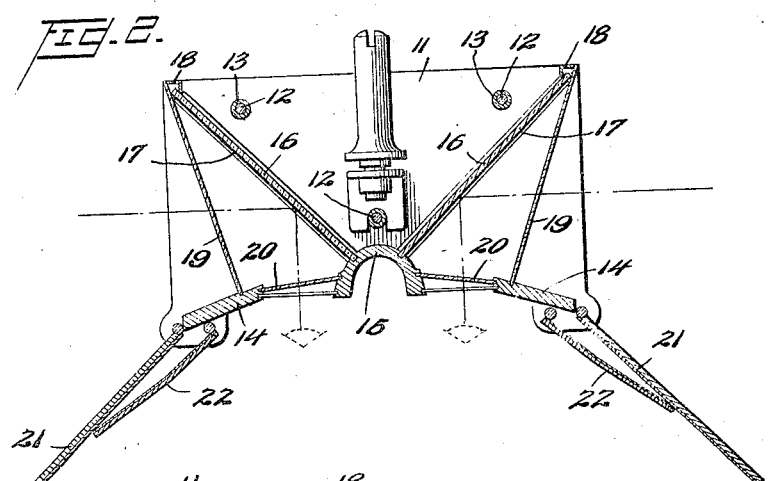
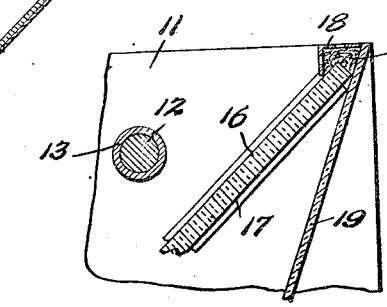
Inventor
W. P. Reaves,
By Watson, Coit, Moser & Grindle.
Attorney Patented Aug. 11, 1925.

1,549,028

UNITED STATES PATENT OFFICE.

WILLIAM P. REAVES, OF GREENSBORO, NORTH CAROLINA.

MIRROR BOX FOR STEREOSCOPES.

Application filed March 3, 1923. Serial No. 622,551.

*To all whom it may concern:*

Be it known that I, WILLIAM P. REAVES, a citizen of the United States, and residing at Greensboro, Guilford County, State of North Carolina, have invented certain new and useful Improvements in Mirror Boxes for Stereoscopes, of which the following is a specification.

The present invention relates to stereoscopes and particularly to mirror boxes designed and constructed especially for use in connection with stereoscopic apparatus.

In my copending application, Serial No. 605,213, filed December 16, 1922, is disclosed and claimed a mirror supporting and protecting box for stereoscopes and the present invention constitutes an improvement upon the mirror box disclosed in that application. It is very desirable in stereoscopic work, as pointed out in the above mentioned application, to utilize mirrors of glass silvered upon their faces instead of upon their rear surfaces, errors, due to double reflection being thereby eliminated. Mirrors of this type have been used in stereoscopic analyses with very satisfactory results but it has been found that mirrors silvered upon their front surfaces are easily damaged by foreign matter, even by the breath of the observer. Such mirror surfaces cannot be touched by the fingers and the air often carries, particularly in hospitals, laboratories and doctors' offices, chemical substances in vaporous form which attacks and seriously injures the silvered reflecting surface.

The breath of the observer is contaminated with end products of oxidation or chemical substances and animal matter of a gummy nature which is deposited on the mirror surface and causes dust to collect on this surface. Fly specks and finger prints usually start oxidation of the silvered surface which is followed by progressive deterioration of the silvered surface around the point thus touched or marred.

Even where the reflecting surface is not destroyed by foreign, particularly chemical, matter it may be dulled so that the image of the radiograph or plate under observation will not be as clear as is necessary for accurate work.

The object of the present invention is to provide a mirror box or mirror supporting device in which mirrors of the most delicate type, for instance mirrors silvered upon their faces instead of upon their rear surfaces may be supported so as to be at all times fully protected against the breath of the observer, chemical substances in vaporous or other form, dust, dirt, moisture, or any materials or substances known to produce oxidation or other deterioration of the mirror surface. The protective means provided for the mirror surfaces are of such character that the observer's view is in no wise obscured or rendered inaccurate by their use and are positioned where there cannot be any reflex from the radiographs to the observer's eyes.

The invention may be embodied in various forms and in the accompanying drawings one embodiment is illustrated by way of example, together with a modification of one detail thereof. In the drawings:

Figure 1 is a front elevation of the improved box;

Figure 2 is a section on line 2—2 of Figure 1; and

Figure 3 is a horizontal section of a corner of the box to an enlarged scale, a modified joint being illustrated.

The general construction of the box is described in detail in my copending application before referred to and will be here but briefly reviewed. The top 10 and the bottom 11 are substantially identical in size and shape and are held in fixed spaced relation by bolts 12 provided with spacing sleeves 13, and by vertical plates 14 at the front. A nose piece 15 also has its ends secured to the top and bottom of the box respectively. Extending diagonally from the central nose piece 15 to the opposite rear corners of the box are mirrors 16, supported in grooves formed in the top and bottom of the box and silvered upon their front surfaces, as indicated by the heavy lines 17. The mirrors make tight joints with the nose piece 15 extending preferably into vertical grooves formed in this member and their vertical rear edges terminate adjacent vertical posts 18 which may be of any desired shape in cross section although preferably angle shaped as shown.

Extending from the rear end of each mirror forwardly is a protective glass plate 19 which fits tightly against the edge of the mirror (with or without packing therebetween) and the top, bottom, and front edges of which are retained respectively in grooves formed in the top, bottom and front piece 14 of the box. Extending between each plate 14 and the nose piece 15 and between the top and bottom of the box is a plate 20 preferably held in grooves formed in these members and making tight joints therewith. It will thus be seen that the front of each mirror is entirely protected so that the breath of the observer and substance or vapors of chemical or other nature cannot come in contact with the silvered surface of the mirror. The plates 19 and 20 are of clear, polished, plano glass and are so arranged that the light rays from the radiograph plates under observation to the eye of the observer are in no wise reflected into the eyes of the observer by the inclosure glass. Dust shutters are indicated at 21 and 22. In the drawings these shutters are illustrated in open position, that is, the position which they occupy when the stereoscope is in use, but it will be understood that when the stereoscope is not in use these shutters will be folded back along the sides of the box in the manner fully brought out in my copending application, so that no dust may collect on the surfaces of the protective glass plates 19 and 20 when the box is not in use, so that the surfaces of these plates need be cleaned only at rare intervals. Slides 23 may be used to limit the size of the view openings.

Figure 3 is an enlarged horizontal sectional view of one corner of the box in which a modified construction is employed. In this construction the mirror 16 and plate 19 are not tightly secured together, so that air may pass through the joint between these members and into the space in front of the mirror. A substance such as wool and saturated or impregnated with a chemical purifying compound is indicated at 24 so that any such air is filtered, the dust being removed therefrom and also the injurious chemical vapors which may be present in the air.

From the above description the nature and advantages of the invention will be apparent to one skilled in the art. By means of the device disclosed mirrors of the most sensitive type may be utilized indefinitely without loss of effectiveness or deterioration. Furthermore, the protective devices are of such a nature that the accuracy or effectiveness of the instrument is in no wise impaired. The protection from oxidation or other contamination prolongs the useful life of the instrument and maintains the mirror surfaces with maximum reflecting powers. The diagnostician is enabled to visualize and make delicate diagnosis where the invention is employed, there being no fogging and blurring of the image as when using a mirror with two reflecting surfaces, that is, a glass silvered upon its rear surface and having a parallel polished front surface, and hence the invention is of great importance in the art of diagnosing disease and other troubles by the aid of radiography.

Increased accuracy of the apparatus often enables the diagnostician to make an earlier diagnosis, and to administer an earlier treatment or apply surgical relief, giving the patient a better chance of recovery before his resistance is dangerously lowered. It will also be apparent that the increased accuracy will often prevent error in the diagnosis of delicate borderline cases.

One skilled in the art will also appreciate that the exact design and arrangement and component elements of the invention may be modified without departing from its spirit and scope.

Having thus described the invention what is claimed as new and desired to be secured by Letters Patent is:

1. In a mirror box for stereoscopes, in combination, a frame, two mirrors supported in said frame and arranged at an angle to each other, each of said mirrors being silvered upon the side adjacent the observer, and means for protecting the reflecting surfaces of the mirrors against destructive vapors or matter without obstructing or deflecting the passage of light rays from the objects under observation to the eye of the observer, said means including plates of polished, plano, clear glass which form, together with the frame of the box and the mirrors, a complete protective enclosure in front of the silvered surfaces of the mirrors.

2. In a mirror box for stereoscopes, in combination, a frame which includes a vertically disposed nose piece, mirrors supported in said frame and arranged at an angle to each other, each of said mirrors being silvered upon the side adjacent the observer, and means for protecting the reflecting surfaces of the mirrors against destructive vapors or other matter without obstructing or deflecting the passage of light rays from the objects under observation to the eye of the observer, said means including plates of polished, plano clear glass which form, together with the frame of the box and the mirrors, closed compartments in front of the mirrors, two of said protective plates having vertical edges which make air-tight joints with said nose piece.

3. In a mirror box for stereoscopes, in combination, a frame comprising top and bottom plates and a nose piece and front corner plates extending vertically between the top and bottom plates, mirrors silvered upon their front surfaces supported in said box at an angle to each other, the adjacent edges of said mirrors making continuous contact with said nose piece, and means for protecting the reflecting surfaces of the mirrors against destructive vapors or other matter without obstructing or deflecting the passage of light rays from the objects under observation to the eye of the observer, said means including four plates of polished, plano, clear glass, two plates extending between the top, bottom, nose piece and corner plates, and two plates extending between the corner plates, top and bottom, and rear edges of the mirrors, whereby closed compartments are formed in front of the mirrors.

4. In a mirror box for stereoscopes, in combination, a frame, two mirrors supported in said frame and arranged at an angle to each other, each of said mirrors being silvered upon the side adjacent the observer, and means for protecting the reflecting surfaces of the mirrors against destructive vapors or matter without obstructing or deflecting the passage of light rays from the objects under observation to the eye of the observer, said means including plates of polished, plano, clear glass which forms together with the frame of the box and the mirrors, compartments in front of the mirrors, and means for filtering the air which passes into said compartments through joints between said members.

In testimony whereof I hereunto affix my signature.

WILLIAM P. REAVES.